United States Patent [19]

D'Amico

[11] 3,904,619
[45] Sept. 9, 1975

[54] DITHIOCARBAMATE DERIVATIVES OF 1,2,4-THIADIAZOLES

[75] Inventor: John Joseph D'Amico, St. Louis, Mo.

[73] Assignee: Monsanto Company, St. Louis, Mo.

[22] Filed: May 14, 1973

[21] Appl. No.: 359,977

[52] U.S. Cl.... 260/246 B; 260/243 B; 260/247.1 M; 260/293.63; 260/293.68; 260/302 D; 260/32.6 R
[51] Int. Cl.² ............... C07D 295/00; C07D 295/30
[58] Field of Search ....... 260/246 B, 302 D, 293.63, 260/243 B, 293.68, 247.1 M

*Primary Examiner*—Donald G. Daus
*Assistant Examiner*—Jose Tovar

[57] ABSTRACT

Compounds of the formula

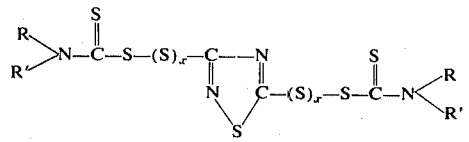

in which $x$ is one or two, R and R' are alkyl, aralkyl, cycloalkyl, or one may be hydrogen, or together with the nitrogen atom to which they are attached form a heterocycle are excellent accelerators and vulcanizing agents for the vulcanization of rubber.

3 Claims, No Drawings

DITHIOCARBAMATE DERIVATIVES OF 1,2,4-THIADIAZOLES

BACKGROUND OF THE INVENTION

This invention relates to 1,2,4-thiadiazol-3,5-diyl bis(trithio- and tetrathiocarbamates) and to vulcanizable compositions containing them.

SUMMARY OF THE INVENTION

According to this invention, compounds characterized by the formula

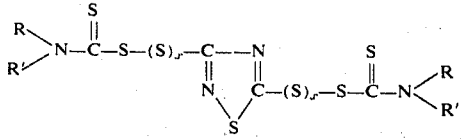

in which $x$ is one or two, R and R' independently are alkyl of 1–8 carbon atoms, aralkyl of 7–10 carbon atoms, cycloalkyl of 5–8 carbon atoms or one may be hydrogen, or R and R' together with the nitrogen atom to which they are attached form a heterocyclicamino radical of 4–8 carbon atoms are excellent accelerators and vulcanizing agents for rubber.

The terms as used herein and in the claims mean as follows: Alkyl means a branched or unbranched saturated acyclic radical derived by removal of one hydrogen atom from an alkane. Alkyl radicals of 1–8 carbon atoms are satisfactory, for example, methyl, ethyl, propyl, isopropyl, n-butyl, sec-butyl, isobutyl, tert-butyl, pentyl, hexyl, 1-methylhexyl, heptyl, and octyl. Aralkyl means phenyl substituted alkyl with radicals of 7–10 carbon atoms being satisfactory and benzyl being preferred. Other aralkyl radicals are α-methylbenzyl, α,α-dimethylbenzyl, xylyl, phenethyl, phenylpropyl and phenylbutyl. Cycloalkyl means a saturated cyclic radical derived by removal of one hydrogen atom from a cycloalkane. Examples of satisfactory cycloalkyl radicals are cyclopentyl, cyclohexyl, 2-methylcyclohexyl, 4-methylcyclohexyl, cycloheptyl, and cyclooctyl. Heterocyclicamino means the radical derived by removal of hydrogen from the nitrogen atom of a cyclic amine. Thus R and R' are joined to each other and along with the nitrogen atom form a heterocyclic ring. It is understood that R and R' may be joined to each other through carbon forming a mono or bicyclic alkylene radical or may be joined to each other through oxygen or sulfur forming a single divalent radical attached to the nitrogen comprising two alkylene radicals interrupted by oxygen or sulfur. Examples of satisfactory heterocyclicamino radicals are pyrrolyidinyl, 2,5-dimethylpyrrolidinyl, piperidino, 4-methylpiperidino, 2,6-dimethylpiperidino, 2,4,6-trimethylpiperidino, 2-ethylpiperidino, morpholino, thiomorpholino, 2,6-dimethylmorpholino, hexahydro-1H-azepin-1-yl and azabicyclo(3.2.2)non-3-yl.

Illustrative examples of compounds of the invention are:

3,5-di(N,N-dimethylthiocarbamoyldithio)-1,2,4-thiadiazole
3,5-di(N,N-diethylthiocarbamoyldithio)-1,2,4-thiadiazole
3,5-di(N,N-dipropylthiocarbamoyldithio)-1,2,4-thiadiazole
3,5-di(N,N-diisopropylthiocarbamoyldithio)-1,2,4-thiadiazole
3,5-di(N,N,-di-n-butylthiocarbamoyldithio)-1,2,4-thiadiazole
3,5-di(N,N,-dibenzylthiocarbamoyldithio)-1,2,4-thiadiazole
3,5-di(N,N-dicyclohexylthiocarbamoyldithio)-1,2,4-thiadiazole
3,5-di(N,N-dimethylthiocarbamoyltrithio)-1,2,4-thiadiazole
3,5-di(N,N-diethylthiocarbamoyltrithio)-1,2,4-thiadiazole
3,5-di(N-methylthiocarbamoyldithio)-1,2,4-thiadiazole
3,5-di(N-ethylthiocarbamoyldithio)-1,2,4-thiadiazole
3,5-di(N-propylthiocarbamoyldithio)-1,2,4-thiadiazole
3,5-di(N-isopropylthiocarbamoyldithio)-1,2,4-thiadiazole
3,5-di(N-n-butylthiocarbamoyldithio)-1,2,4-thiadiazole
3,5-di(N-benzylthiocarbamoyldithio)-1,2,4-thiadiazole
3,5-di(N-cyclohexylthiocarbamoyldithio)-1,2,4-thiadiazole
3,5-di(N-methylthiocarbamoyltrithio)-1,2,4-thiadiazole
3,5-di(N-ethylthiocarbamoyltrithio)-1,2,4-thiadiazole.

Further illustrative examples of compounds of the invention are:

3,5-di(pyrrolidinylthiocarbonyldithio)-1,2,4-thiadiazole,
3,5-di(2,5-dimethylpyrrolidinylthiocarbonyldithio)-1,2,4-thiadiazole,
3,5-di(piperidinothiocarbonyldithio)-1,2,4-thiadiazole,
3,5-di(2,6-dimethylmorpholinothiocarbonyldithio)-1,2,4-thiadiazole,
3,5-di(hexahydro-1H-azepin-1ylthiocarbonyldithio)-1,2,4-thiadiazole,
3,5-di(azabicyclo(3.2.2)non-3-ylthiocarbonyldithio)-1,2,4-thiadiazole,
3,5-di(pyrrolidinylthiocarbonyltrithio)-1,2,4-thiadiazole,
3,5-di(2,5-dimethylpyrrolidinylthiocarbonyltrithio)-1,2,4-thiadiazole,
3,5-di(piperidinothiocarbonyltrithio)-1,2,4-thiadiazole,
3,5-di(2,6-dimethylmorpholinothiocarbonyltrithio)-1,2,4-thiadiazole,
3,5-di(hexahydro-1H-azepin-1-ylthiocarbonyltrithio)-1,2,4-thiadiazole,
3,5-di(azabicyclo(3.2.2)non-3-ylthiocarbonyltrithio)-1,2,4-thiadiazole.

The compounds of this invention are used in the same manner as conventional accelerators and vulcanizing agents. They are incorporated into the rubber by addition to an internal mixer, such as a Banbury mixer, or they may be added to the rubber on a mill. The fully compounded stocks are then heated to effect vulcanization. The amount used varies depending upon the properties desired in the vulcanizates but generally is between 0.2–6.0 parts by weight per 100 parts by weight of rubber with 0.5–2.0 parts by weight per 100 parts by weight of rubber being the amount normally used as accelerators. But when used as vulcanizing agents, 2.0–5.0 parts by weight per 100 parts by weight of rubber are recommended.

The rubber stocks may include conventional compounding ingredients such as carbon blacks, zinc oxide, reinforcing silica, stearic acid, extender oils, phenolic antidegradants, phenylenediamine antidegradants, tackifiers, scorch inhibitors and bonding agents and may also include conventional accelerators. Elemental sulfur is commonly the vulcanizing agent but any sulfur containing vulcanizing agent which at cure temperature or below releases sulfur in the form available to cross-link rubber is suitable. Illustrative sulfur-vulcanizing agents are amine disulfides, for example, dimorpholinodisulfide, and polymeric polysulfides, for example, alkyl phenol disulfide.

The compounds of this invention can be used in any sulfur-vulcanizable diene rubber. Natural and synthetic rubbers and mixtures thereof are suitable. Synthetic rubbers include cis-4-polybutadiene, butyl rubber, ethylene-propylene terpolymers; polymers of 1,3-butadiene, polymers of isoprene, copolymers of 1,3-butadiene with other monomers, for example, styrene, acrylonitrile, isobutylene, and methylmethacrylate.

For the rubber stocks tested and described herein as illustrative of the invention, Mooney scorch times at the designated temperatures are determined by means of a Mooney plastometer. The time in minutes required for the Mooney reading to rise five points above the minimum viscosity is recorded. Longer times on the Mooney scorch test are desirable because this indicates greater processing safety. Cure characteristics are determined at the designated temperatures by means of the Monsanto Oscillating Disk Rheometer which is described by Decker, Wise and Guerry in *Rubber World*, December 1962, page 68. From the Rheometer data, the maximum torque, R max., in Rheometer units is recorded. The increase in torque is a measure of the degree of vulcanization and is proportional to the cross-link density. The time, $t_2$ in minutes for a rise of two Rheometer units above the minimum reading, and the time, $t_{90}$, required to obtain a torque of 90% of the maximum is recorded. The difference, $t_{90}-t_2$, is a measure of the cure rate of the sample. Vulcanizates are prepared by press curing at the selected temperature for the time indicated by the Rheometer data to obtain optimum care. The physical properties of the vulcanizates are measured by conventional methods.

DESCRIPTION OF PREFERRED EMBODIMENTS

Compounds of this invention where $x$ is one are conveniently prepared by reacting carbon disulfide with 1,2,4-thiadiazol-3,5-diyl-sulfenamides or alternatively are prepared by reacting an alkali metal salt of a dithiocarbamate with 1,2,4-thiadiazol-3,5-diyl-sulfenyl chloride (Thaler and McDivitt, *J. Org. Chem.*, Vol 36, pp 14–17, 1971). Compounds of this invention where $x$ is two are conveniently prepared by reacting carbon disulfide with 1,2,4-thiadiazol-3,5-diyl-thiosulfenamides. Suitable 1,2,4-thiadiazol-3,5-diyl-sulfenamides and -thiosulfenamides useful as intermediates in the preparation of the compounds of this invention are disclosed in Marion W. Harman application Ser. No. 359,978 filed May 14, 1973 of which those free of hydrogen on the nitrogen are preferred.

Morpholine (78.6 grams) is added at 25°–30°C in one portion to a stirred slurry comprising 54.1 grams of 1,2,4-thiadiazol-3,5-diyl-sulfenamide (obtainable by oxidative condensation of the dipotassium salt of 3,5-dimercapto-1,2,4-thiadiazole and an excess of concentrated ammonium hydroxide with sodium hypochlorite) in 150 ml of methanol. The mixture is stirred for 24 hours. A clear solution and ammonia evolution is observed in about ½ hour and after about three hours a precipitate forms. The mixture is cooled to 0°C, stirred for ½ hour at 0°–10°C and the precipitate recovered by filtration and air-dried at 25°–30°C. 3,5-Di(morpholinothio)-1,2,4-thiadiazole, m.p. 106°–107°C recrystallized from alcohol, is recovered in 91 percent yield. Chemical analysis gives 37.27% C, 4.95% H, 17.30% N, 10.45% O and 30.02% S compared to 37.47% C, 5.03% H, 17.48% N, 9.99% O and 30.02% S calculated for $C_{10}H_{16}N_4O_2S_3$. Identification is confirmed by nuclear magnetic resonance spectral analysis.

To a stirred slurry comprising 32g (0.1 mole) of 3,5-di(morpholinothio)-1,2,4-thiadiazole in 50 ml of methanol, there is added at room temperature 30.2g (0.4 mole 100 percent excess) of carbon disulfide. Upon addition of the $CS_2$, the temperature decreases to 15°C. The reaction mixture is stirred three days at 25°–30°C. A white precipitate forms after about ten minutes. After adding 100 ml of ethyl ether, a white solid is recovered by filtration, washed with ether and air-dried at 25°–30°C. 3,5-Di(morpholinothiocarbonyldithio)-1,2,4-thiadiazole, m.p. 137°–139°C, is obtained in 99% yield. Identification is confirmed by nuclear magnetic resonance spectral analysis. Chemical analysis gives 30.30% C, 3.31% H, 11.65% N, 7.31% O and 47.56% S compared to 30.49% C, 3.41% H, 11.85% N, 6.77% O and 47.48% S calculated for $C_{12}H_{16}N_4O_2S_7$. The compound may also be named di-SS,SS'-1,2,4-thiadiazol-3,5-diyl-(4-morpholinodithioperoxycarbothioic acid).

A stirred slurry comprising 18 grams of 1,2,4-thiadiazol-3,5-diyl-sulfenamide, 6.4 grams of sulfur and 26.2 grams of morpholine in 75 ml of methanol is heated at reflux (60°–65°C) for 1.5 hours. After cooling to 30°C, 100 ml of petroleum ether is added and mixture stirred for one hour at 25°–30°C. The solids are recovered by filtration and air-dried at 25°–30°C. 3,5-Di(morpholinodithio)-1,2,4-thiadiazole, m.p. 133°–134°C recrystallized from isopropanol, is obtained in 81 percent yield. Chemical analysis gives 30.91% C, 4.02% H, 14.31% N, 9.09% O and 41.92% S compared to 31.23% C, 4.19% H, 14.57% N, 8.32% O and 41.69% S calculated for $C_{10}H_{16}N_4O_2S_5$. Identification is confirmed by NMR spectral analysis.

To a solution comprising 0.1 mole of 3,5-di(morpholinodithio)-1,2,4-thiadiazole in 50 ml of methanol, 0.22 mole of carbon disulfide is added at room temperature. After stirring the reaction mixture overnight, 3,5-di(morpholinothiocarbonyltrithio)-1,2,4-thiazole is recovered.

A solution comprising 0.1 mole of 1,2,4-thiadiazol-3,5-diyl-sulfenyl chloride in 100 ml of benzene is added dropwise at 0°–5°C over a period of 20 minutes to 100 ml of an aqueous solution of sodium N-methyl-N-cyclohexyldithiocarbamate (0.22 mole). The mixture is stirred two hours as the mixture slowly warms to room temperature. After adding 100 ml of water, the precipitate is recovered by filtration, washed with water and air dried. 3,5-Di(N-methyl-N-cyclohexylthiocarbamoyldithio)-1,2,4-thiadiazole is recovered.

A solution comprising 0.1 mole of 1,2,4-thiadiazol-3,5-diyl-sulfenyl chloride in 100 ml of benzene is added dropwise at 0°–5°C over a period of 15 minutes to 100 ml of an aqueous solution of sodium dimethyldithiocarbamate (0.2 mole). The mixture is stirred two hours as the mixture slowly warms to room temperature. After adding 100 ml of water, the precipitate is recovered by filtration and air dried. 3,5-Di(N,N-dimethylthiocarbamoyldithio)-1,2,4-thiadiazole is recovered.

Other compounds of the invention are prepared by similar procedures.

The following table illustrates the use of the compounds of this invention as accelerators and vulcanizing agents in the vulcanization of rubber. A natural rubber masterbatch is prepared by mixing the ingredients shown below in standard rubber mixing equipment. All parts are by weight. Santoflex 13 is N-(1,3-dimethylbutyl)-N'-phenyl-p-phenylenediamine. Vulcanizable compositions are prepared by adding sulfur and compound of this invention or by just adding the compound alone to portions of the masterbatch. The properties of the vulcanizable compositions and of the vulcanizates are determined as previously described.

| Ingredient | Masterbatch Parts by Weight |
| --- | --- |
| Natural rubber | 100.0 |
| Zinc oxide | 3.0 |
| Stearic acid | 2.0 |
| ISAF carbon black | 45.0 |
| Hydrocarbon softener | 5.0 |
| Santoflex 13 | 2.0 |
| TOTAL | 157.0 |

TABLE I

| | 1 | 2 |
| --- | --- | --- |
| Masterbatch | 157.0 | 157.0 |
| Sulfur | 1.0 | — |
| 3,5-Di(morpholinothiocarbonyldithio)-1,2,4-thiadiazole | 1.0 | 3.0 |
| Mooney Scorch at 250°F | | |
| $t_5$, minutes | 4.6 | — |
| Rheometer at 292°F | | |
| $t_{90}$-$t_2$ | 4.9 | — |
| R max | 40.6 | — |
| Rheometer at 328°F | | |
| $t_{90}$-$t_2$ | 1.7 | 6.3 |
| R max | 42.9 | 30.4 |
| Reversion | 6.9 | 0.4 |
| Stress-strain at 292°F | | |
| Cure time, minutes | 15 | — |
| 300% modulus, psi | 1170 | — |
| Ult. tensile, psi | 3270 | — |
| Ult. elongation % | 530 | — |

Stock 1 illustrates the accelerating properties of the compounds of this invention when used with sulfur. Stock 2 illustrates the rubber cross-linking properties of compounds of this invention in the absence of other vulcanizing agents. The data indicate that the resistance to reversion is substantially improved. Comparable good vulcanization properties are exhibited in a styrene-butadiene rubber masterbatch and with other compounds of the invention.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privelege is claimed are defined as follows:

1. A compound of the formula

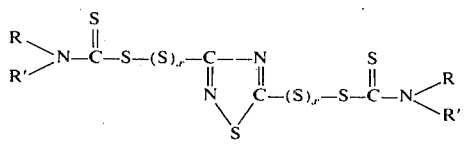

in which $x$ is one or two, R is hydrogen, alkyl of 1–8 carbon atoms, aralkyl of 7–10 carbon atoms, cycloalkyl of 5–8 carbon atoms, and R' is alkyl of 1–8 carbon atoms, aralkyl of 7–10 carbon atoms, cycloalkyl of 5–8 carbon atoms, or R and R' together with the nitrogen atom form pyrrolidinyl, 2,5-dimethylpyrrolidinyl, piperidino, 4-methylpiperidino, 2,6-dimethylpiperidino, 2,4-6-trimethylpiperidino, 2-ethylpiperidino, morpholino, thiomorpholino, 2,6-dimethylmorpholino, hexahydro-1H-azepin-1-yl or azabicyclo(3.2.2)non-3-yl.

2. The compound of claim 1 in which x is one.

3. The compound of claim 2 in which

is morpholino.

* * * * *